Dec. 16, 1969 D. TINI 3,483,898

RETRACTOR

Filed June 8, 1966 2 Sheets-Sheet 1

United States Patent Office 3,483,898
Patented Dec. 16, 1969

3,483,898
RETRACTOR

Dante Tini, Milan, Italy, assignor to International Standard Electric Corporation Filed June 8, 1966, Ser. No. 556,010
Claims priority, application Italy, June 19, 1965, 5,959/65
Int. Cl. H04m *1/04*
U.S. Cl. 179—155 3 Claims

ABSTRACT OF THE DISCLOSURE

A cord receptacle unit integral to a telephone base having a mechanical pulley device arranged to enable the manual withdrawal and automatic re-entry of a flat telephone cord connecting the handset to the base unit of a telephone subscriber set. The unit features a spring biased ratchet controlled pulley for automatically winding the cord responsive to replacing the telephone handset onto the hook switch. The device further comprises the use of a combination of rollers for assuring that the flat side of the cable leaves the receptacle unit parallel to the base thereof although while on the windup pulley, the flat side of the cord is perpendicular to the base thereof.

The present invention relates to cord retractors and more particularly to mechanical devices arranged to enable a manual withdrawal and automatic re-entry of the handset cord of a telephone subset into a suitable receptacle.

The main object of this invention is to provide receptacles or containers for holding the handset connecting cord and to enable the automatic retractions of such cord into the containers built into the subsets so that the cords are not visible when the telephone set is not in use.

In each of the above figures the same reference numbers are used to indicate the same parts forming the device.

Figures 1, 2:
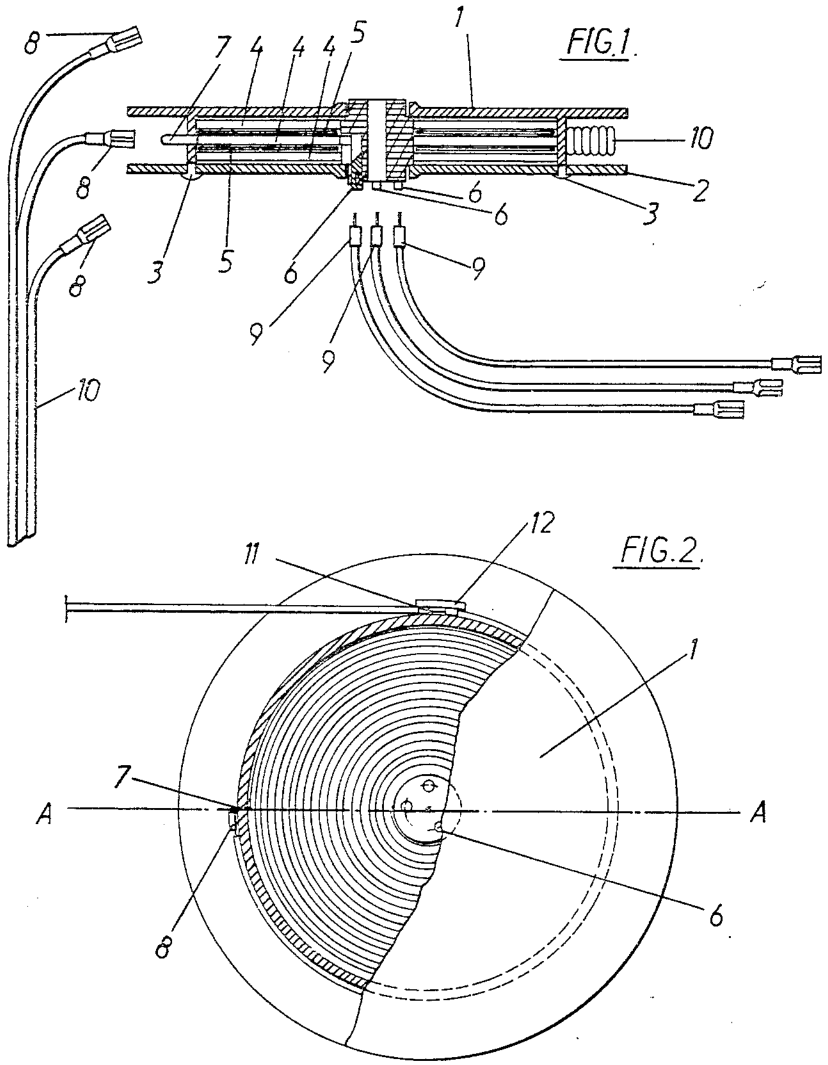
FIG. 1 shows a section view (taken along line A—A of FIG. 2) of the receptacle of the telephone cord according to the present invention.
FIG. 2 shows in a plan view the receptacle of FIG. 1 partially sectioned so as to disclose the members inside the receptacle.

FIGS. 1 and 2 show receptacle 1 having a pulley shaped to hold handset cord 10. The cord is ideally flat and is therefore amenable to orderly coiling in a minimum size. The receptacle is comprised of two parts. Its lower part 2 contains six circumferential slots equidistantly spaced from each other through an angle of 60°. Into these slots go six suitable projections 3 derived from the upper part of the receptacle so that the two parts forming the receptacle can be firmly joined as by swaging. The assembly is accomplished after arranging the mechanical parts inside the receptacle as will be described later.

The electrical continuity between cord leads 10 and the electric circuit of the telephone subset is attained with the aid of spiral springs 4, each of which is secured on one side to a suitable fixed element 6 and on the other side to the movable upper part of receptacle 1. Each lead of the telephone cord is connected to a related spring 4 by inserting lead terminal 8 to terminal 7 of the respective spring. The springs 4 are then connected to the electrical circuit at the case of the telephone set, through leads 9 suitably inserted or welded to fixed parts 6 indicated above. The electric insulating between various springs 4 is effected by interposing insulating discs 5.

Figure 3:
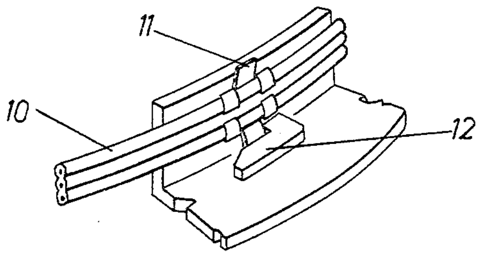
FIG. 3 shows a perspective view of a detail of FIG. 2 relative to the clamping system of the telephone cord according to the present invention.

FIG. 3 is a perspective detail of FIG. 2 showing in detail the system for clamping telephone cord 10 to receptacle 1. Metallic part 11 is pressed fitted to cord 10, and is secured to two elements 12 suitably located in the upper and lower parts of receptacle 1, at the same circumferential position. In FIG. 3, for clarity, only one of the two elements 12, and more precisely, the one located in the upper part of receptacle 1 is shown.

Figure 4:
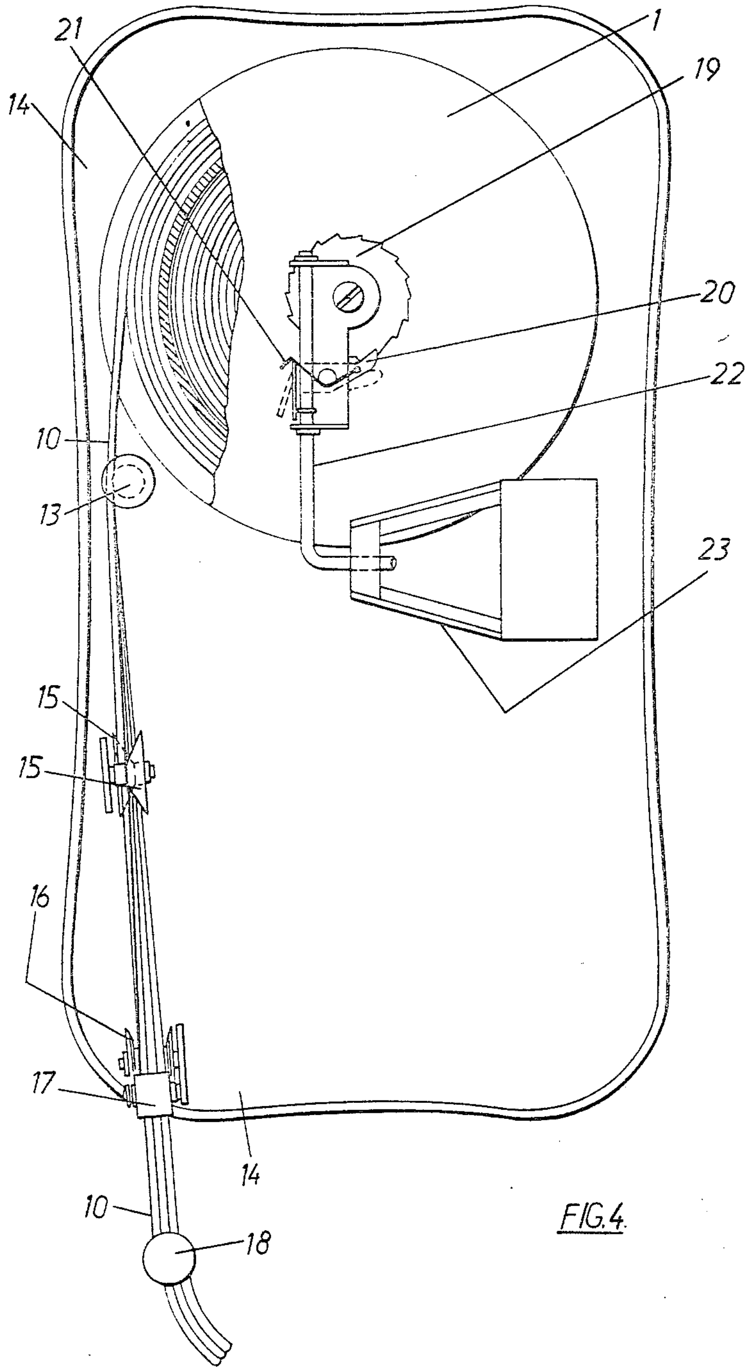
FIG. 4 shows a plan view of the receptacle of FIG. 1 located in a telephone base, with the slide and drive devices of the handset cord for the manual withdrawal and automatic reentry thereof into the seat according to the present invention.

Now by referring to FIG. 4 the slide and drive devices of the telephone cord used for the manual withdrawal and the automatic re-entry or retraction into receptacle 1, at the end of a telephone call will be described.

While cord 10 is withdrawn from receptacle 1 it slides over various rollers which have the double task of preventing the cord from swinging during the sliding and of rotating the cord through 90°, with respect to its position in receptacle 1. The rotation causes the cord to emerge with its own flat surface parallel to base 14. In this way, the cord withdrawal is made easy while lifting the handset to which the cord is connected. The roller 13 normal to the base 14 turns on a vertical pin secured to the base 14. Two conical rollers 15 turn on a pin suitably secured to base 14 impressing on the cord 10 a first rotation through 45° with respect to base 14. Then, two straight rollers 16 and 17 impress on the cord 10 a further rotation through 45° with respect to base 14. To cord 10 is secured in the handset (not shown) by a stop 18. Stop 18 protects the handset from stresses due to the springs of receptacle 1.

Cord 10 is wound in an orderly fashion in receptacle 1 inside the telephone set when the handset is in its own housing. When a telephone call is effected, the cord is manually withdrawn by lifting the handset to which it is connected, along the desired length. The withdrawl is stopped as soon as the pull of the handset user stops because of a special automatic device of the present invention. The device also enables the automatic retraction of the cord into receptacle 1 when the handset is replaced in its on hook position. Thus, the telephone cord, although it has the features of the usual cord traditionally employed in the telephone sets, is hidden in the telephone case when not in use.

The said automatic device operates as follows: the stopping of the cord during the withdrawal occurs because toothed wheel 19 forming part of receptacle 1, is stopped by pawl 20 urged thereon by means of spring 21. The re-entry of the cord, at the end of a telephone call, is effected in that the pawl is released by lever 22 actuated by lever 23 of the hook switch operated by the handset weight, when the latter is replaced in its on hook position.

While the principles of the present invention have been described above with reference to a specific example of a practical embodiment, it is to be clearly understood that this specification is made only as an example and therefore it is not to be considered as a limitation on its scope, as set forth in the following claims.

I claim:

1. In a telephone subset having a handset connecting cord for connecting said handset to the base of said subset,
   said cord being flat,
   hook switch means for receiving said handset,
   said receptacle means including windup pulley means
      for enabling the withdrawal of said cord as said handset is removed from said hookswitch means during the use thereof, said windup pulley being parallel to the base of said receptacle, the flat side of said cord on said pulley being perpendicular to the base of said receptacle, a roller system in said receptacle, said system comprising first roller means arranged vertical to the base, second conical roller means juxtaposed to the first roller means, and third roller means juxtaposed to the second roller means, said second and third roller means causing said flat cord to rotate 90 degrees as it leaves said receptacle so that it leaves said receptacle with its flat side parallel with the base of said receptacle.

2. The subset of claim 1 wherein said windup pulley comprises a stationary hub portion, a movable portion rotatable around said hub portion, first roller means arranged from said movable portion having an outer peripheral portion for receiving said flat cord and an inner portion, said inner portion holding coil springs coupled to said hub means, and means including said springs, and said stationary hub portion for coupling said flat wire to said telephone lines.

3. The subset of claim 2 including means for stopping said cord when it is withdrawn, said stopping means comprising a toothed wheel forming part of the receptacle for said cord, pawl means for stopping said toothed wheel, and said pawl means including spring means.

References Cited

UNITED STATES PATENTS

| | | | |
|---|---|---|---|
| 1,116,402 | 11/1914 | Ferguson | 179—147 |
| 1,247,672 | 11/1917 | Hallberg | 191—12.2 |
| 1,782,191 | 11/1930 | Bolling | 179—155 |

WILLIAM C. COOPER, Primary Examiner

U.S. Cl. X.R.

191—12.2